(12) United States Patent
Takenami et al.

(10) Patent No.: US 8,138,109 B2
(45) Date of Patent: Mar. 20, 2012

(54) ZIRCONIA-MULLITE REFRACTORY RAW MATERIAL AND A PLATE BRICK

(75) Inventors: Masako Takenami, Fukuoka (JP);
Keiichiro Akamine, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 84 days.

(21) Appl. No.: 12/864,455

(22) PCT Filed: Jan. 30, 2009

(86) PCT No.: PCT/JP2009/051632
§ 371 (c)(1),
(2), (4) Date: Aug. 18, 2010

(87) PCT Pub. No.: WO2009/096550
PCT Pub. Date: Aug. 6, 2009

(65) Prior Publication Data
US 2010/0298109 A1 Nov. 25, 2010

(30) Foreign Application Priority Data
Jan. 30, 2008 (JP) .................................. 2008-019173

(51) Int. Cl.
*C04B 35/109* (2006.01)
(52) U.S. Cl. ........................................ 501/105; 501/128
(58) Field of Classification Search .................. 501/105, 501/107, 128
See application file for complete search history.

(56) References Cited

U.S. PATENT DOCUMENTS

| | | | |
|---|---|---|---|
| 4,326,040 A | 4/1982 | Kaji et al. | |
| 6,576,580 B2 * | 6/2003 | Gaubil et al. | 501/105 |

FOREIGN PATENT DOCUMENTS

| | | |
|---|---|---|
| AU | 660165 | 6/1995 |
| JP | 56096774 | 8/1981 |
| JP | 56096775 A | 8/1981 |
| JP | 01048219 | 10/1989 |
| JP | 4300242 A | 10/1992 |
| JP | 5319919 A | 12/1993 |
| JP | 10101439 A | 4/1998 |
| JP | 10067569 A | 10/1998 |
| JP | 2000-044327 | 2/2000 |

OTHER PUBLICATIONS

International Search Report published Aug. 6, 2009 for PCT/JP2009/051632, filed Jan. 30, 2009.

* cited by examiner

*Primary Examiner* — Karl Group
(74) *Attorney, Agent, or Firm* — Martin Fleit; Paul D. Bianco; Fleit Gibbons Gutman Bongini & Bianco PL

(57) ABSTRACT

Provided is a zirconia-mullite refractory raw material which is less likely to undergo alternation and microstructural degradation under high-temperature conditions, and low in thermal expansion rate, so as to have thermal shock resistance and corrosion resistance. The zirconia-mullite refractory raw material comprises crystalline zirconia and mullite as primary components, with the remainder being corundum and/or a matrix glass, wherein the crystalline zirconia includes a eutectic zirconia crystal having a grain size of 1.0 μm or less, and has a maximum grain size of 30 μm or less, and the matrix glass is contained in an amount of 5 mass % or less. The zirconia-mullite refractory raw material has a chemical composition comprising 30 to 55 mass % of $ZrO_2$, 30 to 55 mass % of $Al_2O_3$ and 10 to 25 mass % of $SiO_2$, wherein each of the chemical components falls within a primary phase region of $ZrO_2$ in an $Al_2O_3$—$ZrO_2$—$SiO_2$ system phase diagram.

12 Claims, 3 Drawing Sheets

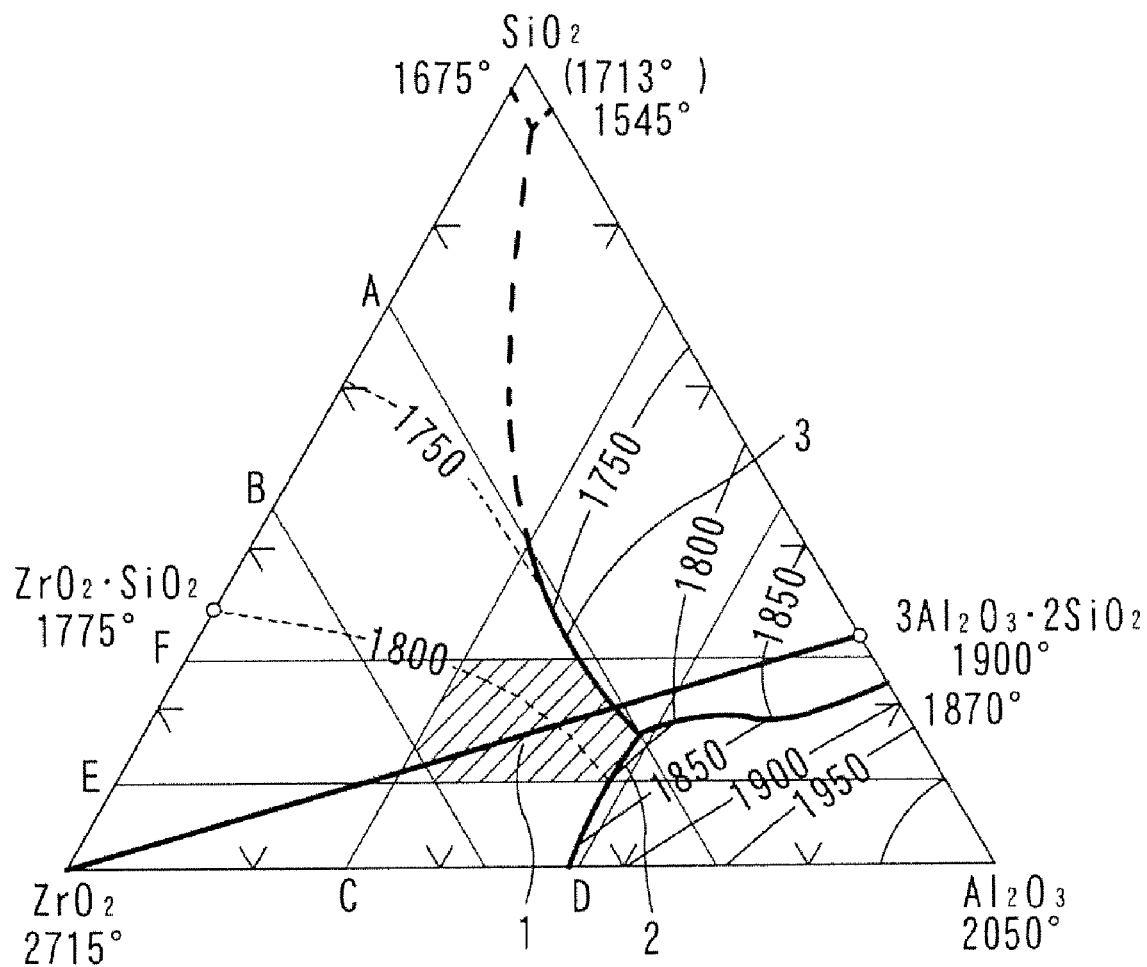

[FIG. 2A]
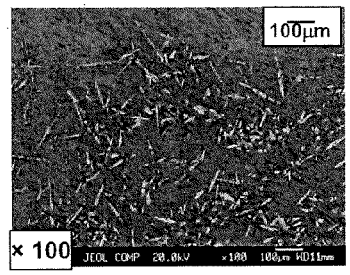
[FIG. 3A]
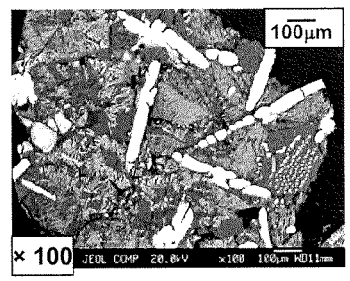
[FIG. 2B]
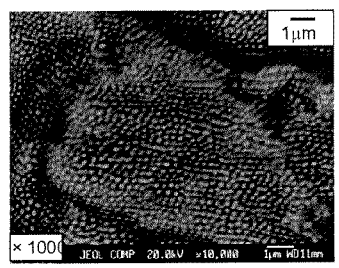
[FIG. 3B]
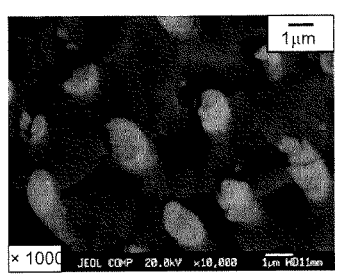
[FIG. 4A]
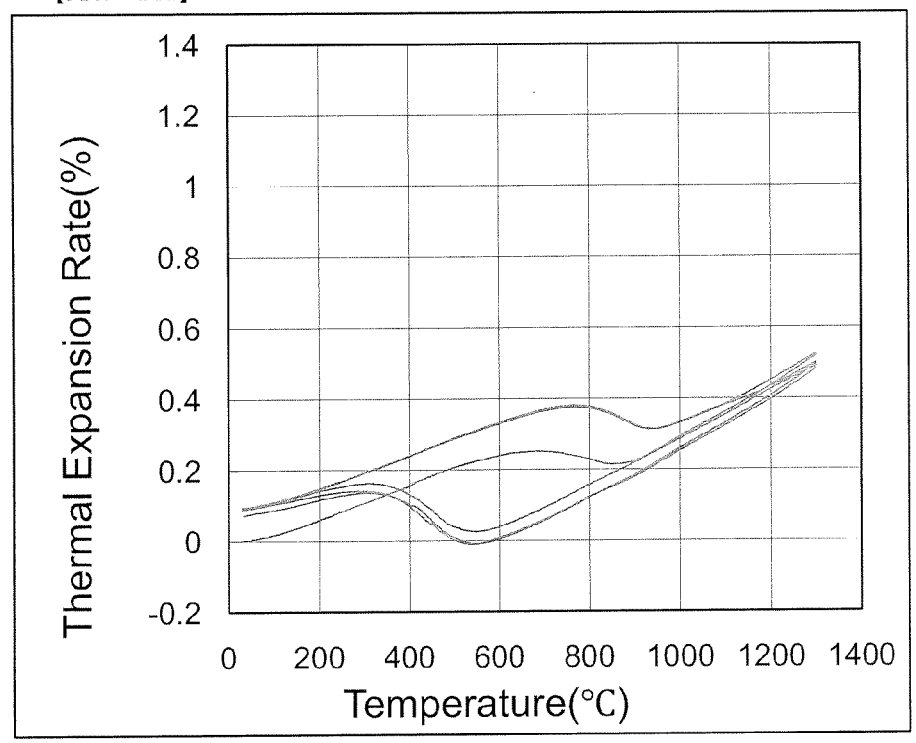

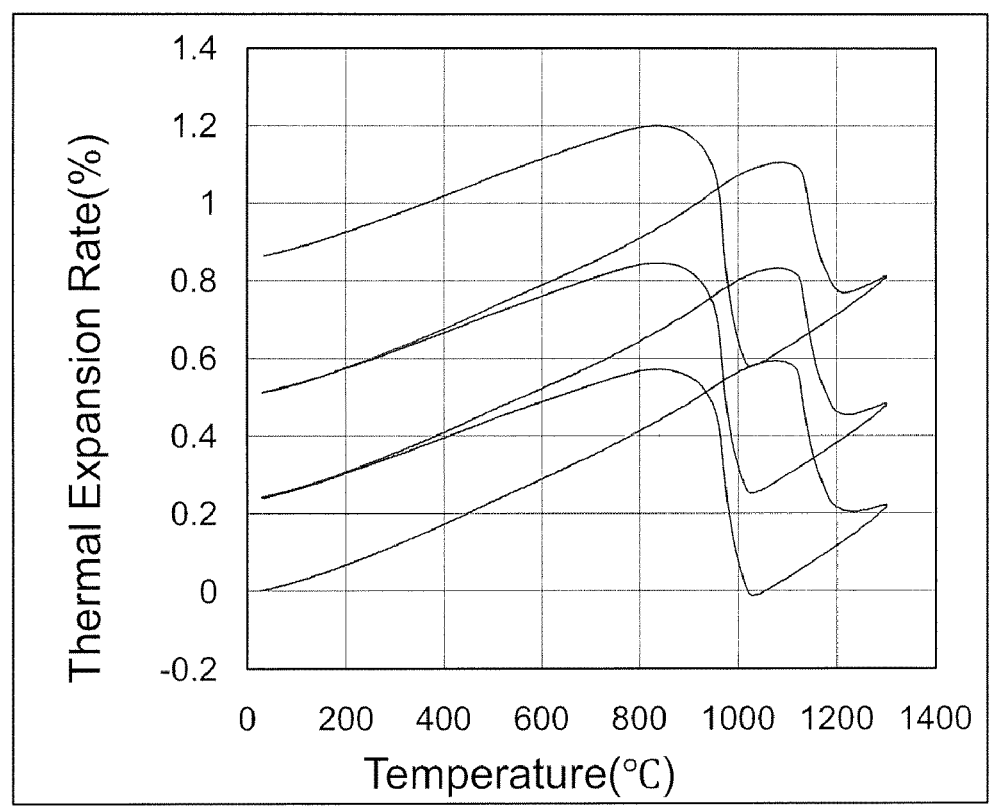
[FIG. 4B]

ZIRCONIA-MULLITE REFRACTORY RAW MATERIAL AND A PLATE BRICK

TECHNICAL FIELD

The present invention relates to a zirconia-mullite refractory raw material which is usable as a refractory raw material for refractory and ceramic products, and, particularly, obtainable through a fusion process and suitable as a raw material for a refractory product for continuous casting, such as a plate brick or a nozzle, and a plate brick using the zirconia-mullite refractory raw material.

BACKGROUND ART

In the fields of iron and steel, nonferrous metals, cement, incinerators, ash melting furnaces, etc., refractory products are widely employed, and a zirconia-mullite refractory raw material is commonly used as a raw material for the refractory products. Particularly, it is widely used as a refractory raw material for a plate brick or a nozzle to be used in a sliding nozzle device for controlling a flow volume of molten steel during continuous casting of steel.

Generally, a zirconia-mullite refractory raw material is industrially produced through a fusion process designed to melt a mixture of zircon and alumina or a mixture of zirconia, silica and alumina, using an electric arc furnace or the like. The zirconia-mullite refractory raw material comprises a mineral phase consists mainly of crystalline zirconia and mullite, wherein crystal grains of the crystalline zirconia are dispersed in a microstructure of a refractory product to prevent the development of a crack. In addition, it is considered to be excellent in thermal shock resistance because of its low thermal expansion rate as compared with other refractory raw materials such as alumina.

In typical zirconia-mullite, crystal grains of crystalline zirconia include a relatively large crystal (primary zirconia crystal) having a grain size of about 100 µm, which is precipitated as a primary phase during cooling after melting, and a relatively small crystal (eutectic zirconia crystal) having a grain size of about 10 µm or less, which is precipitated at a eutectic point in a last stage of the cooling. As for the primary zirconia crystal to be precipitated as a primary phase, after a seed crystal is precipitated in an initial stage of the cooling, the crystal will grow along with the cooling, so that it is formed as a relatively large crystal having a grain size of about 100 µm. As for the eutectic zirconia crystal to be precipitated at a eutectic point, a liquid phase is crystallized in the last stage of the cooling at a time, and thereby crystal growth is not promoted, so that it is formed as a fine crystal having a grain size of about 10 µm or less.

As for the mullite, precipitation is initiated after the primary zirconia crystal is precipitated, and the precipitated crystal grows up to about 100 µm along with the cooling. A matrix glass exists to fill each gap between the crystals.

In such a microstructure, the primary zirconia crystals and the mullite exist as relatively large crystals, so that the matrix glass as a matrix part thereof consisting primarily of $SiO_2$, and the gap, become larger.

For example, as a refractory product using such a zirconia-mullite refractory raw material, a refractory product for continuous casting is described in the following Patent Document 1, which uses a zirconia-mullite refractory raw material having a mineral phase consisting primarily of mullite and baddeleyite (crystalline zirconia), and comprising, as chemical components, 30 to 80 mass % of $Al_2O_3$, 10 to 65 mass % of $ZrO_2$, and 5 to 25 mass % of $SiO_2$. The refractory product using this zirconia-mullite refractory raw material is described as having a low thermal expansion rate and excellent corrosion resistance.

Further, a refractory product for continuous casting is described in the following Patent Document 2, which contains electro-fused alumina-zirconia, wherein an average diameter of primary alumina crystals is in the range of 5 to 70 µm, and zirconia is contained in an amount of 5 to 43 mass %. It is described therein that, if the average diameter of alumina crystals to be precipitated as primary phases is set in the range of 5 to 70 µm, the primary alumina crystals and alumina-zirconia eutectic crystals will be mixed finely and complexly, so that energy required for cracking an electro-fused alumina-zirconia grain becomes larger, and thereby thermal shock resistance is improved as compared with a conventional alumina-zirconia raw material.

A fused alumina-zirconia-silica based refractory material is described in the following Patent Document 3, which has a basic microstructure consisting of corundum crystals, baddeleyite crystals (crystalline zirconia) and a matrix glass, wherein the refractory material contains: as chemical components and in mass % on the basis of oxide, $ZrO_2$ in an amount of 25 to 32%; $Al_2O_3$ in an amount of 55 to 67%; $SiO_2$ in an amount of 5 to 12%; $P_2O_5$ in an amount of 0.05 to 0.5%; $B_2O_3$ in an amount of 0.05 to 0.5%; and $Na_2O$ and $K_2O$ in an individual amount of 0.1 to 0.5% and in a total amount of 0.6% or less. It is described therein that $Na_2O$ and $K_2O$ as chemical components are contained in an individual amount of 0.1 to 0.5% and in a total amount of 0.6% or less to achieve an effect of suppressing leaching of a matrix glass consisting primarily of $SiO_2$ during use under a high temperature of 1400° C. or more.

[Patent Document 1] JP 56-96775A
[Patent Document 2] JP 2000-44327A
[Patent Document 3] JP 10-101439A

DISCLOSURE OF THE INVENTION

Problem to be Solved by the Invention

The refractory product using the zirconia-mullite refractory raw material described in the Patent Document 1 is formed as a refractory product excellent in thermal shock resistance and corrosion resistance. However, it is known that, when used with steel of a type having a high oxygen concentration in steel, or steel of a type added with Ca, the refractory product is subjected to wear due to a reaction between an $SiO_2$ component of the zirconia-mullite and a component of the steel, such as FeO or CaO, to cause significant deterioration in durability. Moreover, if the zirconia-mullite refractory raw material is employed in a refractory product containing carbon, and used under high-temperature conditions for a long period of time, a microstructure thereof will be altered and degraded to cause a problem of deterioration in durability. The cause is assumed that an inside of a microstructure of the refractory product is placed in a low oxygen concentration and a strong reducing atmosphere, and thereby the matrix glass consisting primarily of $SiO_2$ is reduced and dissipated as SiO gas, resulting in alteration of the zirconia-mullite.

The refractory raw material described in the Patent Document 2 contains no $SiO_2$ component, and has a dense microstructure, so that it is excellent in not only corrosion resistance but also abrasion resistance. However, due to its thermal expansion rate greater than that of a zirconia-mullite refractory raw material, it is impossible to obtain an effect equivalent to that of the zirconia-mullite refractory raw material in terms of a thermal shock resistance.

The zirconia-mullite refractory raw material described in the following Patent Document 3 contains a matrix glass in an amount of 15 to 20 mass %. Thus, if the zirconia-mullite refractory raw material is used in a refractory product for molten steel, it is subjected to wear due to a reaction with a component of the steel, such as FeO or CaO, to cause significant deterioration in durability, as mentioned above.

It is therefore an object of the present invention to provide a zirconia-mullite refractory raw material which is excellent in corrosion resistance against FeO, CaO, etc., and less likely to undergo alternation and microstructural degradation under high-temperature conditions, while being low in thermal expansion rate, so as to satisfy required thermal shock resistance and corrosion resistance, and which is particularly optimal as a refractory raw material for use in a refractory product for continuous casting, and a plate brick using the zirconia-mullite refractory raw material.

Means for Solving the Problem

In order to solve the above problems, through various studies with a focus on a microstructure of a zirconia-mullite refractory raw material, the inventors have accomplished the present invention.

Specifically, the present invention provides a zirconia-mullite refractory raw material which is obtained through a fusion process. The zirconia-mullite refractory raw material comprises crystalline zirconia and mullite as primary components, with the remainder being corundum and/or a matrix glass, wherein the crystalline zirconia includes a eutectic zirconia crystal having a grain size of 1.0 μm or less, and the matrix glass is contained in an amount of 5 mass % or less.

In cases where a zirconia-mullite refractory raw material is produced through a fusion process, a cooling rate during cooling of a molten mixture exerts an influence on a grain size of the refractory raw material, and a smaller grain size is obtained as the cooling rate becomes higher. Thus, in a zirconia-mullite refractory raw material which is obtained through a fusion process to have a small eutectic zirconia crystal, any crystal other than the eutectic zirconia crystal also becomes small in grain size, which means that it has a dense microstructure. Further, in a zirconia-mullite refractory raw material where a eutectic zirconia crystal has a grain size of 1.0 μm or less, preferably, 0.5 μm or less, and a matrix glass is contained in an amount of 5 mass % or less, it has a dense microstructure, i.e., excellent corrosion resistance, and a small volume change, i.e., excellent thermal shock resistance, as compared with the conventional zirconia-mullite refractory raw materials. If the grain size of the eutectic zirconia crystal is greater than 1.0 μm, the microstructure becomes less dense, resulting in insufficient corrosion resistance and thermal shock resistance.

The dense microstructure of the zirconia-mullite refractory raw material makes it possible to prevent microstructural alternation and degradation when used under high-temperature conditions for a long period of time. It is believed that this is because the dense microstructure can suppress spreading of a strong reducing atmosphere in a microstructure of a refractory product during use.

As used herein, the term "eutectic zirconia crystal" means a relatively small zirconia crystal which is precipitated at a eutectic point in a last stage of cooling during production of the zirconia-mullite refractory raw material through a fusion process. Further, the term "primary zirconia crystal" means a relatively large zirconia crystal which is precipitated in an initial stage of the cooling. The two types of crystals can be readily distinguished from each other by a grain size thereof through microscopic observation. Further, in the microscopic observation, the eutectic zirconia crystal has a feature that it is observed as an aggregate of fine crystals, and adjacent ones of the crystals are oriented in the same direction. Differently, in the primary zirconia crystal, there is almost no directional characteristic between adjacent ones of the crystals. Further, in terms of a grain size, the eutectic zirconia crystal has a grain size which is about 1/5 or less of a maximum grain size of the zirconia crystal.

In the present invention, the term "eutectic zirconia crystal having a grain size of 1.0 μm or less" means that, in a microscopic observation field-of-view, 95%/area or more of eutectic zirconia crystals have a grain size of 1.0 μm or less. Further, in the present invention, the term "crystalline zirconia has a maximum grain size of 30 μm or less" means that, when 10 particles of the zirconia-mullite refractory raw material each having a particle size of 0.5 to 3 mm are microscopically observed to measure respective grain sizes of 20 crystals in descending order of grain size, an average value of the measured grain sizes is 30 μm or less, as described in detail later.

Meanwhile, the term "crystalline zirconia" means a crystalline body containing a $ZrO_2$ component in an amount of 95 mass % or more, wherein a crystalline morphology thereof comprises one or more selected from the group consisting of a monoclinic system, a cubic system and a tetragonal system. One reason is that, when the crystalline zirconia is partially stabilized by incorporating an impurity, such as $Y_2O_3$ or $TiO_2$, into $ZrO_2$ as a solid solution, the stabilized crystal has a tetragonal system or a cubic system. Another reason is that, in a process of rapidly cooling the molten mixture to produce the zirconia-mullite refractory raw material of the present invention, zirconia having a tetragonal system in a high-temperature region of 1170° C. or more is partially kept in the tetragonal system without a phase transition to a monoclinic system during the rapid cooling.

In the zirconia-mullite refractory raw material, a smaller amount of the matrix glass provides enhanced corrosion resistance against FeO or CaO during use as a refractory product. Thus, it is preferable that no matrix glass is contained. However, as long as a content of the matrix glass is 5 mass % or less, a negative effect thereof is negligibly small. If the content is greater than 5 mass %, the corrosion resistance against FeO or CaO becomes deteriorated, and alternation and microstructural deterioration of the zirconia-mullite refractory raw material due to dissipation of an $SiO_2$ component during exposure to high-temperature conditions for a long period of time becomes significant to cause significant deterioration in durability.

The corundum in the zirconia-mullite refractory raw material can improve corrosion resistance against molten metal. Thus, in cases where the zirconia-mullite refractory raw material is used for a refractory product necessary to give priority to corrosion resistance, a certain amount of corundum may be contained. Otherwise, if it is used for a refractory product necessary to give priority to thermal shock resistance, it is preferable to minimize a content ratio of corundum in the zirconia-mullite refractory raw material, or contain no corundum. For example, in cases where it is used as a refractory raw material for a refractory product for continuous casting, it is preferable to minimize a content ratio of corundum.

The present invention further provides a zirconia-mullite refractory raw material which consists of crystalline zirconia and mullite, wherein the crystalline zirconia includes a eutectic zirconia crystal having a grain size of 1.0 μm or less.

Preferably, in the zirconia-mullite refractory raw material of the present invention, the crystalline zirconia has a maximum grain size of 30 μm or less. In this case, a microstructure thereof becomes denser to provide enhanced corrosion resistance.

Preferably, a chemical composition of the zirconia-mullite refractory raw material of the present invention satisfies the following requirements: it comprises 30 to 55 mass % of $ZrO_2$, 30 to 55 mass % of $Al_2O_3$ and 10 to 25 mass % of $SiO_2$, and each of the chemical components falls within a primary phase region of $ZrO_2$ in an $Al_2O_3$—$ZrO_2$—$SiO_2$ system phase diagram.

The zirconia-mullite refractory raw material satisfying the above requirements has a smaller zirconia grain size and a denser microstructure, which provides higher thermal shock resistance and corrosion resistance. It is assumed that this is because, in the zirconia-mullite refractory raw material satisfying the above requirements, in the course of cooling of a molten mixture during production, primary zirconia crystals are firstly precipitated, and then mullite and corundum are sequentially precipitated in this order, which suppresses excessive formation of corundum and glass.

The primary phase region 1 of $ZrO_2$ is shown in the $Al_2O_3$—$ZrO_2$—$SiO_2$ system phase diagram of FIG. 1. In FIG. 1, the line A indicates that a content ratio of $ZrO_2$ is 30 mass %, and the line B indicates that the content ratio of $ZrO_2$ is 55 mass %. The line C indicates that a content ratio of $Al_2O_3$ is 30 mass %, and the line D indicates that the content ratio of $Al_2O_3$ is 55 mass %. The line E indicates that a content ratio of $SiO_2$ is 10 mass %, and the line F indicates that content ratio of $SiO_2$ is 25 mass %.

If an amount of $ZrO_2$ in the zirconia-mullite refractory raw material is less than 30 mass %, formation of microcracks in a matrix during a phase transition of the crystalline zirconia becomes deteriorated to cause deterioration in an effect of reducing an elastic modulus of a refractory product. If the amount is greater than 55 mass %, an influence of the phase transition of the crystalline zirconia on volume change characteristics becomes larger to cause destruction of a matrix structure of the refractory product and deterioration in strength and thermal shock resistance of a refractory product.

The $Al_2O_3$ component in the zirconia-mullite refractory raw material reacts with the $SiO_2$ component to form mullite. Thus, if an amount of $Al_2O_3$ is less than 30 mass %, an amount of mullite to be formed in the refractory raw material is reduced to cause deterioration in thermal shock resistance. Moreover, an amount of the $SiO_2$ component and/or an amount of the $ZrO_2$ component are relatively increased. If the $ZrO_2$ component is excessively increased, the influence of a phase transition of the crystalline zirconia on volume change characteristics becomes large to cause not only deterioration in strength and thermal shock resistance of a refractory product due to destruction of a matrix structure of the refractory product, but also deterioration in corrosion resistance due to accelerated formation of a low-melting point substance from a reaction with FeO. If the $SiO_2$ component is excessively increased, it forms a low-melting point substance from a reaction with FeO or CaO to cause deterioration in corrosion resistance. If the amount of $Al_2O_3$ is greater than 55 mass %, the amount of $SiO_2$ and/or the amount of $ZrO_2$ are relatively reduced to cause deterioration in the effect of reducing a thermal expansion rate and an elastic modulus.

If an amount of $SiO_2$ in the zirconia-mullite refractory raw material is less than 10 mass %, an amount of mullite becomes insufficient to cause an increase in thermal expansion rate. If the amount is greater than 25 mass %, it is more likely to form a low-melting point substance from a reaction with FeO or CaO to cause deterioration in corrosion resistance.

An apparent porosity of the zirconia-mullite refractory raw material of the present invention is preferably 3.0% or less, more preferably 2.0% or less. If the apparent porosity is greater than 3.0%, a level of denseness of the zirconia-mullite refractory raw material becomes insufficient, so that SiO gas is easily dissipated through gaps existing in the microstructure of the zirconia-mullite refractory raw material, which is liable to accelerate alternation and microstructural degradation of the zirconia-mullite refractory raw material. Moreover, a specific surface area of the zirconia-mullite refractory raw material becomes larger, which is liable to accelerate wear due to a reaction with FeO or CaO Preferably, the zirconia-mullite refractory raw material of the present invention contains $Na_2O$, $K_2O$, CaO, MgO, $P_2O_5$, $B_2O_3$, $Fe_2O_3$ and $MnO_2$ in a total amount of 1.0 mass % or less. If the total amount of these components is greater than 1.0 mass %, a melting point of the matrix glass becomes lower to cause deterioration in corrosion resistance of the zirconia-mullite refractory raw material, and further cause deterioration in thermal shock resistance due to accelerated microstructural degradation in the zirconia-mullite refractory raw material itself during heat receiving at high temperatures.

As used herein, the term "matrix glass" means an amorphous glass phase which does not have a specific crystal structure consisting primarily of $SiO_2$. In the zirconia-mullite refractory raw material, the matrix glass exists to fill each gap between crystals, such as the crystalline zirconia and the mullite. An amount of the matrix glass can be quantitatively determined from chemical components and quantitative determination of a mineral phase by an X-ray diffractometry-based internal reference method.

The zirconia-mullite refractory raw material of the present invention may be contained in a plate brick in an amount of 5 to 40 mass % to provide a plate brick excellent in corrosion resistance and thermal shock resistance.

In the plate brick containing the zirconia-mullite refractory raw material of the present invention, the small thermal expansion rate of the zirconia-mullite refractory raw material prevents an excessive formation of microspaces between the zirconia-mullite particles and a matrix during heat receiving, to provide adequate strength and elastic modulus. In addition, a thermal expansion rate around 1000° C. is reduced, so that thermal shock resistance is improved.

More specifically, during actual use of the plate brick, heating and cooling are repeated. Thus, a plate brick containing the conventional zirconia-mullite refractory raw material has large residual expansion, so that a microstructure thereof becomes more loosened along with an increase in the number of usages to cause degradation in the microstructure. In contrast, the plate brick containing the zirconia-mullite refractory raw material of the present invention has almost no residual expansion, so that microstructural degradation during repetitive use is suppressed to allow the number of usable cycles to be increased. Further, a transition temperature becomes lower as the crystalline zirconia of the zirconia-mullite refractory raw material has a smaller grain size. This makes it possible to form an adequate microspace at a relatively low temperature so as to reduce an elastic modulus to effectively provide thermal shock resistance to the plate brick.

If a content of the zirconia-mullite refractory raw material in the plate brick is less than 5 mass %, the effect of reducing a thermal expansion rate to improve spalling resistance becomes deteriorated. If the content is greater than 40 mass %, corrosion resistance becomes deteriorated.

Effect of the Invention

The zirconia-mullite refractory raw material of the present invention is significantly low in alternation and microstructural degradation under high-temperature conditions, and excellent in thermal shock resistance and corrosion resistance, as compared with the conventional zirconia-mullite refractory raw materials. Thus, it can be used in place of the conventional zirconia-mullite refractory raw materials to improve durability of refractory and ceramic products. Further, it is usable in a plate brick to improve durability thereof.

BEST MODE FOR CARRYING OUT THE INVENTION

The zirconia-mullite refractory raw material of the present invention is produced or obtained by: preparing a mixture of starting materials consisting of zircon and alumina or of a zirconia, silica and alumina; subjecting the starting-material mixture to a fusion process designed to melt the starting-material mixture using an electric arc furnace or the like; and, after melting the starting-material mixture, rapidly cooling the molten mixture. The zircon may be zircon sand. The alumina may be calcinated alumina or sintered alumina, and the zirconia may be naturally-occurring baddeleyite or desiliconized baddeleyite. The silica may be a naturally-occurring silica material, such as silica stone, or a synthetic silica material, such as microsilica or silica flour.

The rapid cooling may include a technique of allowing the molten mixture to flow along a water-cooled iron plate, a technique of pouring the molten mixture into a frame formed by assembling iron plates together, and a technique of pouring the molten mixture into a vessel bedded with iron balls.

The zirconia-mullite refractory raw material obtained in the above manner has a dense microstructure with fine crystals. Specifically, a dense microstructure with fine crystals can be obtained by setting a cooling rate of the starting-material mixture in a molten state to a high value to suppress crystal growth of crystalline zirconia and mullite. Further, a grain size of primary and eutectic zirconia crystals can be controlled by controlling rapid-cooling conditions, i.e., a cooling amount. Consequently, a porosity of the zirconia-mullite refractory raw material can also be controlled.

A chemical composition of the starting-material mixture, i.e., a mixture of the starting materials to be subjected to a fusion process, is adjusted to have comprising 30 to 55 mass % of $ZrO_2$, 30 to 55 mass % of $Al_2O_3$ and 10 to 25 mass % of $SiO_2$, wherein each of the chemical components falls within a primary phase region of $ZrO_2$ in an $Al_2O_3$—$ZrO_2$—$SiO_2$ system phase diagram. In this case, it becomes possible to more easily obtain a zirconia-mullite refractory raw material in which crystalline zirconia includes a eutectic zirconia crystal having a grain size of 1.0 μm or less, and has a maximum grain size of 30 μm or less, and a matrix glass is contained in an amount of 5 mass % or less.

In a situation where each of the chemical components is out of the primary phase region of $ZrO_2$, i.e., falls within a composition range 2 in FIG. 1 which is a primary phase region of corundum, during rapid cooling of the melting raw materials in a molten state, the $Al_2O_3$ component in the melting raw materials causes rapid precipitation of corundum crystals, so that it becomes difficult to form the $SiO_2$ component and the mullite. As a result, the content of matrix glass phase is liable to be 10 mass % or more.

In another situation where each of the chemical components falls within a composition range 3 in FIG. 1 which is a primary phase region of mullite, although a matrix glass phase is not significantly formed, the content of $ZrO_2$ is relatively reduced to less than about 30 mass %, so that formation of microcracks, i.e., an effect of reducing an elastic modulus of a refractory product, is liable to becomes deteriorated.

Further, a total amount of $Na_2O$, $K_2O$, CaO, MgO, $P_2O_5$, $B_2O_3$, $Fe_2O_3$ and $MnO_2$ in the zirconia-mullite refractory raw material is set to 1.0 mass % or less. For this purpose, a content of theses components in the starting materials may be preliminarily controlled. A level of formation of the matrix glass can be reduced by reducing the content of the components.

A microstructure of the zirconia-mullite refractory raw material of the present invention comprises crystalline zirconia and mullite as primary components, with the remainder being corundum and/or a matrix glass. For example, the microstructure may consist only of crystalline zirconia and mullite.

In view of enhancing thermal shock resistance, it is preferable that a total content ratio of the crystalline zirconia and the mullite in the entire microstructure is 85 mass % or more. If the total content ratio is less than 85 mass %, the thermal shock resistance tends to largely deteriorate. Further, it is preferable that a content ratio of the crystalline zirconia is in the range of 30 to 55 mass %. If the content ratio is less than 30 mass %, formation of microcracks in a matrix during a phase transition of the crystalline zirconia becomes deteriorated to cause deterioration in the effect of reducing an elastic modulus of a refractory product. If the content ratio is greater than 55 mass %, an influence of the phase transition of the crystalline zirconia on volume change characteristics becomes larger, which is liable to cause destruction of a matrix structure of the refractory product and deterioration in strength and thermal shock resistance of a refractory product.

In the corundum of the zirconia-mullite refractory raw material, a cleavage crack is likely to grow in a crystal thereof. Thus, if a corundum crystal is formed in the zirconia-mullite refractory raw material, a cleavage crack in the corundum crystal is liable to become a defect, which could be a factor spoiling denseness of the zirconia-mullite refractory raw material. For this reason, it is preferable to minimize a content ratio of corundum or contain no corundum. As long as the content ratio is 20 mass % or less, the adverse effect is negligibly small, and a corrosion resistance-enhancing effect can be obtained. If the content ratio is greater than 20 mass %, a thermal expansion rate becomes large to cause deterioration in thermal shock resistance.

Each of the content ratios of the above mineral phases can be quantitatively determined based on an X-ray intensity ratio. More specifically, it can be quantitatively determined by chemical component analysis, such as fluorescent X-ray analysis or electron probe X-ray microanalysis (EPMA), or by a commonly-used X-ray diffractometry-based internal reference method using standard samples of corundum, crystalline zirconia, mullite, etc.

The content ratio of the matrix glass consisting primarily of $SiO_2$ can be obtained by quantitatively determining a content of $SiO_2$ through chemical component analysis, such as fluorescent X-ray analysis or EPMA, and subtracting, from the $SiO_2$ content, an amount of $SiO_2$ contained in the mullite phase, which is quantitatively determined through the X-ray diffractometry-based internal reference method.

In the present invention, the crystalline zirconia includes a eutectic zirconia crystal having a grain size of 1.0 μm or less, and has a maximum grain size of 30 μm or less. In view of obtaining a denser microstructure, it is preferable to minimize a maximum grain size of the mullite. Specifically, the maximum grain size of the mullite is preferably 50 µm or less, more preferably 30 µm or less. As with the crystalline zirconia, the maximum grain size of the mullite can be controlled by controlling the cooling rate of the molten mixture.

As used herein, the term "maximum grain size" means a value obtained by microscopically observing 10 particles of the zirconia-mullite refractory raw material each having a particle size of 0.5 to 3 mm are microscopically observed to measure respective grain sizes of 20 crystals in descending order of grain size, and averaging the measured grain sizes. Generally, each of crystalline zirconia and crystalline mullite includes an elongate columnar crystal, a block-like crystal, or a dendritic crystal. In the present invention, the term "grain size" means a maximum outer diameter of such a crystal in a direction perpendicular to a longitudinal axis of the crystal. Further, in an actual microscopic observation, the crystal is observed in the form of a cross section cut at an arbitrary position. Therefore, a length of the outer diameter of the crystal in the direction perpendicular to the longitudinal axis of the crystal is measured in consideration of an orientation of the crystal in each cross section.

The zirconia-mullite refractory raw material of the present invention can be used in place of the conventional zirconia-mullite refractory raw material to improve thermal shock resistance and corrosion resistance without any adverse effect. In particular, when it is used in a refractory product for iron/steel making, the advantage becomes prominent. Specifically, it can be used in a plate brick so as to improve durability thereof.

EXAMPLE

Tables 1 and 2 show Inventive Examples and Comparative Examples.

The zirconia-mullite refractory raw material was experimentally produced by; melting about 1 ton of each mixture of starting materials in Tables 1 and 2 at about 2000° C. using an electric fusion furnace; and, after uniformly melting the mixture, subjecting the molten mixture to a rapid-cooling process designed to pour the molten mixture kept at the temperature into a grid-shaped iron frame to rapidly cool the molten mixture, or a slow-cooling process designed to cooling the molten mixture while being left in a molten material vessel. Control of a grain size of the crystalline zirconia was performed by changing a size of the iron frame (cooling amount).

As for the chemical composition or chemical components, a quantitative analysis was performed by fluorescent X-ray analysis based on JIS 82216. As for the mineral phases, quantitative determination for each mineral phase was performed by an X-ray diffractometry-based internal reference method. As for the matrix glass, an amount of the matrix glass was determined by subtracting, from a quantitative analysis result on the $SiO_2$ component based on the fluorescent X-ray analysis, an amount of $SiO_2$ contained in the mullite phase, which is obtained by the X-ray diffractometry.

Each of the experimentally-produced refractory raw materials was embedded in resin, and, after curing the resin, an obtained specimen was polished. Then, a microstructure of the refractory raw material was observed by a reflecting microscope to check a maximum grain size of the crystalline zirconia.

As for a thermal expansion rate, each of the experimentally-produced refractory raw materials was pulverized to a particle size of 0.044 mm or less, and a columnar-shaped sample was formed, and subjected to a heat treatment. Then, thermal expansion characteristics were checked by thermo-mechanical analysis (TMA).

As for an apparent porosity, after each of the experimentally-produced refractory raw materials was pulverized, obtained particles were sieved to select particles each having a size of 3.35 to 2.0 mm, and the selected particles were checked based on JIS 82205.

Further, after measuring an apparent porosity, each of the experimentally-produced refractory raw materials was put in an alumina crucible, and the alumina crucible was put in a vessel made of a silicon carbide-based refractory material. Then, the vessel was filled with coke particles, and closed by a cover. In this state, each of the experimentally-produced refractory raw materials was continuously subjected to a heat treatment in an electric furnace at a temperature of 1500° C. for 10 hours, and then an apparent porosity was measured again to evaluate microstructural degradation due to alternation and dissipation of the matrix glass under high temperatures, from the post-heat treatment apparent porosity.

As for corrosion resistance, each of the experimentally-produced refractory raw materials having a given particle size by the particle size selection was mixed with a phenol resin. Then, the mixture was formed in a square column shape having a size of 30×30×150, and fired within Coke Breeze at 1000° C. for 3 hours to obtain a sample. The sample was evaluated by using an iron oxide powder as a corrosive material, in a high-frequency induction furnace. In Tables 1 and 2, the corrosion resistance is indicated by a wear index, wherein a larger value means a higher level of wear, i.e., that the corrosion resistance becomes more inadequate. The wear index is determined on an assumption that a wear amount in Comparative Example 7 is 100.

In the "chemical components" in Tables 1 and 2, the "others 1" shows a total content ratio of $Na_2O$, $K_2O$, $CaO$, $MgO$, $P_2O_5$, $B_2O_3$, $Fe_2O_3$ and $MnO_2$, and the "others 2" shows a total content ratio of $Al_2O_3$, $ZrO_2$, $SiO_2$, and other chemical components except the "others 1".

In Table 1, each of Inventive Examples 1 to 4 falls within the scope of the present invention, i.e., the crystalline zirconia includes a eutectic zirconia crystal having a grain size of 1.0 µm or less, and has a maximum grain size of 30 µm or less, and the matrix glass is contained in an amount of 5 mass % or less. As seen in Table 1, each of Inventive Examples 1 to 4 is less likely to undergo alternation and microstructural degradation under high-temperature conditions, because its apparent porosity (pre-heat treatment apparent porosity) and post-heat treatment apparent porosity are smaller than those of Comparative Example 7 which is a conventional zirconia-mullite refractory raw material, and excellent in corrosion resistance against FeO, because its wear index is smaller than that of Comparative Example 7.

Each of Comparative Examples 1 to 6 is out of the scope of the present invention, because it does not contain mullite as a mineral phase. Each of Comparative Examples 1 to 6 is insufficient in thermal shock resistance due to its high thermal expansion rate. Moreover, it contains a relatively small amount of $SiO_2$ and $ZrO_2$ components, and a relatively large amount of $Al_2O_3$, so that corundum precipitated in an initial stage of the cooling is excessively crystallized to preclude formation of mullite. Thus, the $SiO_2$ component entirely exists as a matrix glass, and thereby the post-heat treatment apparent porosity is increased up to 3.0% or more, resulting in significant microstructural degradation.

Each of Comparative Examples 7 to 9 was prepared using the same starting materials as those of Inventive Example 3 and at a cooling rate reduced by changing the size (e.g., thickness) of the iron frame for use in the experimental production, so that a eutectic zirconia crystal had a grain size of greater than 1.0 μm which is out of the scope of the present invention. Consequently, the pre-heat treatment apparent porosity was increased to 4.8 to 6.2%, and thereby an intended dense microstructure was not obtained. Moreover, this caused an increase in the post-heat treatment apparent porosity, which led to deterioration in corrosion resistance due to significant microstructural degradation after heat receiving and degradation in the denseness.

Comporting between pre-heat treatment apparent porosities of Inventive Example 3 and Comparative Example 7, there is a large difference therebetween. Specifically, the pre-heat treatment apparent porosity in Inventive Example 3 is 0.7%, whereas the pre-heat treatment apparent porosity in Comparative Example 7 is 4.8%. Further, as for the gain size of the eutectic zirconia crystal and the maximum grain size of the crystalline zirconia, there is also a large difference therebetween. Specifically, the gain size of the eutectic zirconia crystal in Inventive Example 3 is 0.2 μm, whereas the grain size of the eutectic zirconia crystal in Comparative Example 7 is 1.2 μm, and the maximum grain size of the crystalline zirconia in Inventive Example 3 is 21 μm, whereas the maximum grain size of the crystalline zirconia in Comparative Example 7 is 52 μm. Consequently, Inventive Example 3 had a significantly superior result in terms of corrosion resistance. This means that, if the grain size of the zirconia is reduced, a microstructure becomes dense, and thereby corrosion resistance against FeO is enhanced. It can be also said that corrosion resistance against CaO is enhanced.

Each of Comparative Examples 10 and 11 contains an excessive amount of $SiO_2$ component, and thereby a large amount (8.0% or 18.7%) of matrix glass, so that post-heat treatment apparent porosity is increased to 4.7% or 5.2%, which caused significant microstructural degradation. Moreover, an amount of silica glass is also increased, which caused significant deterioration in corrosion resistance.

FIG. 2A shows a microscope (reflecting microscope) photograph of a zirconia-mullite refractory raw material obtained in Inventive Example 3, and FIG. 2B shows a microscope (electron microscope) closeup-photograph of a eutectic zirconia crystal thereof. FIG. 3A shows a microscope (reflecting microscope) photograph of a zirconia-mullite refractory raw material obtained in Comparative Example 7, and FIG. 3B shows a microscope (electron microscope) closeup-photograph of a eutectic zirconia crystal thereof. In each figure, a whitish portion is crystalline zirconia.

In FIG. 2A, a while crystal having a clearly recognizable shape is a primary zirconia crystal, whereas a eutectic zirconia crystal is unrecognizable due to its excessively small size. Thus, the primary zirconia crystal and the eutectic zirconia crystal are different in size, and can be clearly distinguished from each other. In FIG. 2A, the maximum grain size of the crystalline zirconia is 30 μm or less. In FIG. 2B which is a closeup-photograph of the eutectic zirconia crystal, the grain size thereof is 1.0 μm or less.

In FIG. 3A, a white and large crystal is a primary zirconia crystal. The primary zirconia crystal comprises a rectangular crystal and an oval crystal each including long and short types. The shape of the primary zirconia crystal varies depending on a cross section of the crystal appearing on an observation surface. In FIG. 3A, a large crystalline zirconia has a maximum grain size of greater than 30 μm, and a portion recognizable as a white point or line with a size of 10 μm or less is a eutectic zirconia crystal but not a primary zirconia crystal. The eutectic zirconia crystal has a feature that it is observed as a group of a plurality of crystals oriented in the same direction, or an aggregate of points or lines. In FIG. 3B which is a closeup-photograph of the eutectic zirconia crystal, a cross section of the crystal in a direction approximately perpendicular and slightly oblique to a longitudinal axis thereof is observed. As seen in FIG. 3B, a contour (grain size) of the crystal in this cross section is greater than 1.0 μm. As in this photogram, a eutectic zirconia crystal has a columnar shape, in many cases.

In Table 2, each of Inventive Examples 5 to 7 contains a small amount of impurity consisting of the "others 1", so that it contains a matrix glass in a small amount of 5 mass % or less, and thereby maintains denseness in a microstructure even after the heat treatment and excellent corrosion resistance. In addition, it has a low thermal expansion rate of 0.6 to 0.63 and sufficiently high thermal shock resistance.

In contrast, each of Comparative Examples 12 and 13 contains a matrix glass in an amount out of the scope of the present invention, so that the post-heat treatment apparent porosity is increased to 3.1% or 3.6%, which caused significant microstructural degradation after heat receiving and significant deterioration in corrosion resistance.

In Inventive Examples 8 and 9, baddeleyite, calcinated alumina and silica flour were used as starting materials, and a mixing ratio thereof was changed to have 29.0 to 54.0 mass % of $Al_2O_3$, 55.0 to 30.0 mass % of $ZrO_2$ and 15.0 mass % of $SiO_2$. After melting a mixture of the starting materials, the molten mixture was rapidly cooled to obtain a zirconia-mullite refractory raw material.

Each of Inventive Examples 8 and 9 has a low thermal expansion rate of 0.62% or 0.66%, and sufficient thermal shock resistance. In addition, it contains a matrix glass in a small amount of 3.6 mass % or 0.8 mass %, and thereby maintains denseness in a microstructure even after the heat treatment. Further, it has excellent corrosion resistance.

FIG. 4A shows a measurement result on a thermal expansion rate of the zirconia-mullite refractory raw material in Inventive Example 3 under repetitive thermal loading, and FIG. 4B shows a measurement result on a thermal expansion rate of the zirconia-mullite refractory raw material in Comparative Example 7 under repetitive thermal loading.

In order to check thermal expansion characteristics of a zirconia-mullite refractory raw material subjected to repetitive thermal loading, a columnar test piece cut out from a post-cooling fused sample to have a height diminution of 20 mm and a diameter of 10 mm was used as a measurement sample. A heating process from room temperature to 1300° C. and a cooling process were repeated 3 times to measure the thermal expansion characteristics based on thermo-mechanical analysis (TMA).

As seen in FIG. 4A, the zirconia-mullite refractory raw material in Inventive Example 3 has a small thermal expansion rate at 1300° C., and a small volume change during a phase transition. In addition, it has a small residual expansion in the first cycle of thermal loading, and has almost no residual expansion in the second and third cycles of thermal loading. In contrast, as seen in FIG. 4B, the zirconia-mullite refractory raw material in Comparative Example 7 has a high thermal expansion rate at about 1100° C., and largely shrinks at a temperature higher than about 1100° C. due to a phase transition. Moreover, a residual expansion of about 0.2% occurs when cooled to room temperature in the first cycle of thermal loading. Then, a residual expansion is increased by repeating the heating in the second and third cycles of thermal loading.

In Table 1, the maximum grain size of the crystalline zirconia is 21 μm in Inventive Example 3 and 52 μm in Comparative Example 7, and the grain size of the eutectic zirconia crystal is 0.2 μm in Inventive Example 3 and 1.2 μm in Comparative Example 7. Thus, it is proven that the above difference in the thermal expansion characteristics is caused by a difference in the grain size of the crystalline zirconia. As above, the zirconia-mullite refractory raw material of the present invention is small in thermal expansion rate and residual expansion, and small in volume change during a phase transition, so that it serves as a refractory raw material having significantly excellent thermal shock resistance. In particular, it can drastically improve a life of a refractory or ceramic product to be used under conditions subjected to repetitive thermal loading. For example, it can be used as a refractory material for a plate brick so as to drastically increase the number of usable cycles of the plate brick.

A plate brick as a carbon-containing refractory product was prepared using the zirconia-mullite refractory raw material obtained in Inventive Example 3, and an effect thereof was compared with that of a plate brick prepared using the zirconia-mullite refractory raw material in Comparative Example 7 as an example of a conventional zirconia-mullite refractory raw material. A particle size of the zirconia-mullite refractory raw material was set in the range of 1 mm to less than 2 mm. This plate brick was obtained by embedding the zirconia-mullite refractory raw material in a refractory vessel filled with coke particles and firing it at 1000° C.

Table 3 shows a result of a comparative evaluation using a so-called fired plate brick obtained by firing a shaped body of a mixture prepared using each of the zirconia-mullite refractory raw materials, under the above conditions.

A conventional zirconia-mullite refractory raw material (Comparative Example 7) and an alumina-zirconia refractory raw material were added, respectively, to Comparative Example 14 and Comparative Example 15, each in an amount of 20 mass %.

As compared with conventional plate bricks, Inventive Example 10 produced using zirconia-mullite refractory raw material obtained in inventive Example 3 is superior in both thermal shock resistance and corrosion resistance. Further, Inventive Example 10 was experimentally used in an A steel plant as a plate brick of a sliding nozzle device for a ladle. As a result, Inventive Example 10 could be used for 7 operation cycles with less wear in a nozzle hole, and durability was improved by about 30% as compared with the conventional zirconia-mullite refractory raw material.

It is considered that this is because the zirconia-mullite refractory raw material in Inventive Example 3 has a dense microstructure based on crystalline zirconia with a small grain size, which functions to suppress penetration of FeO into the zirconia-mullite so as to prevent a reaction with the $SiO_2$ component. It is also assumed that this is because the zirconia-mullite refractory raw material in Inventive Example 3 has a small residual expansion, which functions to suppress microstructural degradation even in repetitive usage. As above, the zirconia-mullite refractory raw material of the present invention can be used in a plate brick so as to extend the life of the plate brick.

Table 4 shows a result of a comparative evaluation using a so-called unfired plate brick obtained by subjecting the shaped body to a heat treatment at 300° C. A particle size of the zirconia-mullite refractory raw material was set in the range of 1 mm to less than 2 mm.

A conventional zirconia-mullite refractory raw material (Comparative Example 7) and an alumina-zirconia refractory raw material were added, respectively, to Comparative Example 16 and Comparative Example 17, each in an amount of 20 mass %.

As compared with conventional plate bricks, Inventive Example 11 produced using zirconia-mullite refractory raw material obtained in inventive Example 3 is superior in both thermal shock resistance and corrosion resistance. Further, Inventive Example 11 was experimentally used in a B steel plant as a plate brick for a ladle. As a result, Inventive durability was improved by about 30%. As above, it was verified that durability is improved even in the unfired plate brick as with the fired plate brick in Table 3.

TABLE 1

| | | Comparative Example 1 | Comparative Example 2 | Comparative Example 3 | Comparative Example 4 | Comparative Example 5 | Comparative Example 6 |
|---|---|---|---|---|---|---|---|
| Production method | Cooling | Rapid cooling | Rapid cooling | Rapid cooling | Rapid cooling | Rapid cooling | Rapid cooling |
| Starting Material (mass %) | zircon | 10 | 15 | 20 | 25 | 30 | 40 |
| | calcinated alumina | 90 | 85 | 80 | 75 | 70 | 60 |
| Chemical Components (mass %) | $Al_2O_3$ | 89.0 | 84.0 | 79.0 | 74.0 | 69.0 | 59.0 |
| | $ZrO_2$ | 6.7 | 10.1 | 13.4 | 16.8 | 20.2 | 26.9 |
| | $SiO_2$ | 3.3 | 4.9 | 6.6 | 8.2 | 9.8 | 13.1 |
| | others 1 | 0.1 | 0.1 | 0.1 | 0.1 | 0.1 | 0.1 |
| | others 2 | 0.9 | 0.9 | 0.9 | 0.9 | 0.9 | 0.9 |
| Mineral Phase (mass %) | mullite | — | — | — | — | — | — |
| | crystalline zirconia | 6.7 | 10.1 | 13.4 | 16.8 | 20.2 | 26.9 |
| | matrix glass | 3.3 | 4.9 | 6.6 | 8.2 | 9.8 | 13.1 |
| | corundum | 89.0 | 84.0 | 79.0 | 74.0 | 69.0 | 59.0 |
| Grain Size of Eutectic Zirconia Crystal (μm) | | 1 | 2 | 1.5 | 2 | 3 | 2 |
| Maximum Grain Size of Crystalline Zirconia (μm) | | 2 | 5 | 7 | 8 | 10 | 12 |
| Apparent Porosity (%) | | 1.8 | 2.2 | 2.5 | 2.8 | 2.2 | 1.8 |
| Post-Heat Treatment Apparent Porosity (%) | | 3.2 | 3.4 | 3.8 | 4.2 | 4.8 | 5.5 |
| Thermal Expansion Rate (%) | 1300° C. | 0.94 | 0.9 | 0.85 | 0.83 | 0.82 | 0.8 |
| Corrosion Resistance | | | | | | | |
| Wear Resistance | | 50 | 52 | 55 | 60 | 65 | 70 |

TABLE 1-continued

|  |  | Inventive Example 1 | Inventive Example 2 | Inventive Example 3 | Inventive Example 4 |
|---|---|---|---|---|---|
| Production method | Cooling | rapid cooling | rapid cooling | rapid cooling | rapid cooling |
| Starting Material (mass %) | zircon | 45 | 50 | 55 | 60 |
|  | Calcinated alumina | 55 | 50 | 45 | 40 |
| Chemical Components (mass %) | $Al_2O_3$ | 54.0 | 49.0 | 44.0 | 39.0 |
|  | $ZrO_2$ | 30.3 | 33.6 | 37.0 | 40.3 |
|  | $SiO_2$ | 14.7 | 16.4 | 18.0 | 19.7 |
|  | others 1 | 0.1 | 0.1 | 0.1 | 0.1 |
|  | others 2 | 0.9 | 0.9 | 0.9 | 0.9 |
| Mineral Phase (mass %) | mullite | 49.7 | 55.2 | 60.7 | 54.3 |
|  | crystalline zirconia | 30.3 | 33.6 | 37.0 | 40.3 |
|  | matrix glass | 0.7 | 0.8 | 0.9 | 4.4 |
|  | corundum | 19.3 | 10.3 | 1.4 | 0.0 |
| Grain Size of Eutectic Zirconia Crystal (μm) |  | 0.2 | 0.2 | 0.2 | 0.3 |
| Maximum Grain Size of Crystalline Zirconia (μm) |  | 18 | 20 | 21 | 24 |
| Apparent Porosity (%) |  | 0.8 | 0.8 | 0.7 | 0.6 |
| Post-Heat Treatment Apparent Porosity (%) |  | 1.1 | 1.2 | 1.1 | 1.5 |
| Thermal Expansion Rate (%) | 1300° C. | 0.72 | 0.72 | 0.62 | 0.55 |
| Corrosion Resistance |  |  |  |  |  |
| Wear Resistance |  | 65 | 65 | 70 | 75 |

|  |  | Comparative Example 7 | Comparative Example 8 | Comparative Example 9 | Comparative Example 10 | Comparative Example 11 |
|---|---|---|---|---|---|---|
| Production method | Cooling | Slow cooling | Slow cooling | Slow cooling | Rapid cooling | Rapid cooling |
| Starting Material (mass %) | zircon | 55 | 55 | 55 | 65 | 80 |
|  | calcinated alumina | 45 | 45 | 45 | 35 | 20 |
| Chemical Components (mass %) | $Al_2O_3$ | 44.0 | 44.0 | 44.0 | 34.0 | 19.0 |
|  | $ZrO_2$ | 37.0 | 37.0 | 37.0 | 43.7 | 53.8 |
|  | $SiO_2$ | 18.0 | 18.0 | 18.0 | 21.3 | 26.2 |
|  | others 1 | 0.1 | 0.1 | 0.1 | 0.1 | 0.1 |
|  | others 2 | 0.9 | 0.9 | 0.9 | 0.9 | 0.9 |
| Mineral Phase (mass %) | mullite | 60.7 | 60.7 | 60.7 | 47.3 | 26.5 |
|  | crystalline zirconia | 37.0 | 37.0 | 37.0 | 43.7 | 53.8 |
|  | matrix glass | 0.9 | 0.9 | 0.9 | 8.0 | 18.7 |
|  | corundum | 1.4 | 1.4 | 1.4 | 1.0 | 1.0 |
| Grain Size of Eutectic Zirconia Crystal (μm) |  | 1.2 | 2.5 | 4 | 0.4 | 0.3 |
| Maximum Grain Size of Crystalline Zirconia (μm) |  | 52 | 82 | 110 | 24 | 20 |
| Apparent Porosity (%) |  | 4.8 | 5.5 | 6.2 | 1.2 | 1.5 |
| Post-Heat Treatment Apparent Porosity (%) |  | 5.9 | 6.2 | 7.1 | 4.8 | 5.2 |
| Thermal Expansion Rate (%) | 1300° C. | 0.65 | 0.66 | 0.67 | 0.52 | 0.5 |
| Corrosion Resistance |  |  |  |  |  |  |
| Wear Resistance |  | 100 | 103 | 105 | 135 | 150 |

TABLE 2

|  |  | Inventive Example 5 | Inventive Example 6 | Inventive Example 7 | Comparative Example 12 | Comparative Example 13 | Inventive Example 8 | Inventive Example 9 |
|---|---|---|---|---|---|---|---|---|
| Production method | Cooling | rapid cooling | rapid cooling | rapid cooling | rapid cooling | rapid cooling | rapid cooling | rapid cooling |
| Starting Material (mass %) | baddeleyite |  |  |  |  |  | 55 | 30 |
|  | zircon | 55 | 55 | 55 | 55 | 55 |  |  |
|  | calcinated alumina | 45 | 45 | 45 | 45 | 45 | 30 | 55 |
|  | silica flour |  |  |  |  |  | 15 | 15 |
| Chemical Components (mass %) | $Al_2O_3$ | 44.0 | 44.0 | 44.0 | 44.0 | 43.5 | 29.0 | 54.0 |
|  | $ZrO_2$ | 37.0 | 37.0 | 37.0 | 36.0 | 36.0 | 55.0 | 30.0 |
|  | $SiO_2$ | 18.0 | 18.0 | 18.0 | 18.0 | 18.0 | 15.0 | 15.0 |
|  | others 1 | 0.0 | 0.5 | 1.0 | 1.5 | 2.0 | 0.1 | 0.1 |
|  | others 2 | 1.0 | 0.5 | 0.9 | 0.5 | 0.5 | 0.9 | 0.9 |
| Mineral Phase (mass %) | mullite | 63.9 | 57.6 | 48.0 | 41.6 | 32.0 | 40.4 | 50.6 |
|  | crystalline zirconia | 24.9 | 37.0 | 37.0 | 36.0 | 36.0 | 55.0 | 30.0 |
|  | matrix glass | 0.0 | 1.8 | 4.5 | 6.3 | 9.0 | 3.6 | 0.8 |
|  | corundum | 11.2 | 3.7 | 10.5 | 16.1 | 23.0 | 0.0 | 18.7 |
| Grain Size of Eutectic Zirconia Crystal (μm) |  | 0.2 | 0.3 | 0.5 | 1.2 | 1.3 | 0.3 | 0.3 |

TABLE 2-continued

|  | Inventive Example 5 | Inventive Example 6 | Inventive Example 7 | Comparative Example 12 | Comparative Example 13 | Inventive Example 8 | Inventive Example 9 |
|---|---|---|---|---|---|---|---|
| Maximum Grain Size of Crystalline Zirconia (μm) | 20 | 25 | 28 | 28 | 27 | 25 | 24 |
| Apparent Porosity (%) | 0.6 | 0.7 | 0.7 | 1.2 | 1.6 | 0.9 | 1.4 |
| Post-Heat Treatment Apparent Porosity (%) | 0.8 | 1.2 | 1.8 | 3.1 | 3.6 | 1.4 | 1.5 |
| Thermal Expansion 1300° C. Rate (%) | 0.6 | 0.62 | 0.63 | 0.65 | 0.65 | 0.62 | 0.66 |
| Corrosion Resistance |  |  |  |  |  |  |  |
| Wear Resistance | 68 | 72 | 80 | 100 | 105 | 65 | 75 |

TABLE 3

|  | Comparative Example 14 | Comparative Example 15 | Inventive Example 10 |
|---|---|---|---|
| Firing Temperature (° C.) | 1000 | 1000 | 1000 |
| Alumina (coarse particles to fine particles) | 60 | 60 | 60 |
| Zirconia-Mullite (conventional type: Comparative Example 7) | 20 |  |  |
| Alumina-Zirconia (conventional type) |  | 20 |  |
| Zirconia-Mullite (Inventive Example 3) |  |  | 20 |
| Carbon powder | 5 | 5 | 5 |
| Fine Alumina powder | 10 | 10 | 10 |
| Metal Si powder | 5 | 5 | 5 |
| Phenol Resin *1 | 4 | 4 | 4 |
| Spalling Resistance *2 | crack: low | crack: medium | crack: very low |
| Corrosion Resistance *3 | 100 | 85 | 80 |
| Durability in A Steel Plant (cycle) *4 | 5 | 4 | 7 |

*1: An additional mess part with respect to 100 mass parts which is a total amount of other mixed materials
*2: A level of crack was evaluated after heating a sample at 1500° C. for 5 hours and then immersing it in hot metal at 1600° C., for 3 minutes.
*3: A sample was evaluated using molten FeO as a corrosive material, in an induction furnace. A smaller value indicates better corrosion resistance.
*4: A test result obtained by using a sample as an SN plate in an A steel plant. The value indicates the number of usable cycles.

TABLE 4

|  | Comparative Example 16 | Comparative Example 17 | Inventive Example 11 |
|---|---|---|---|
| Firing Temperature (° C.) | 300 | 300 | 300 |
| Alumina (coarse particles to fine particles) | 60 | 60 | 60 |
| Zirconia-Mullite (conventional type: Comparative Example 7) | 20 |  |  |
| Alumina-Zirconia (conventional type) |  | 20 |  |
| Zirconia-Mullite (Inventive Example 3) |  |  | 20 |
| Carbon powder | 5 | 5 | 5 |
| Fine Alumina powder | 10 | 10 | 10 |
| Metal Si powder | 5 | 5 | 5 |
| Phenol Resin *1 | 4 | 4 | 4 |
| Spalling Resistance *2 | crack: high | crack: medium | crack: low |
| Corrosion Resistance *3 | 100 | 80 | 75 |
| Durability in B Steel Plant (cycle)*4 | 7 | 7 | 9 |

*1: An additional mess part with respect to 100 mass parts which is a total amount of other mixed materials
*2: A level of crack was evaluated after heating a sample at 1500° C. for 5 hours and then immersing it in hot metal at 1600° C., for 3 minutes.
*3: A sample was evaluated using molten FeO as a corrosive material, in an induction furnace. A smaller value indicates better corrosion resistance.
*4: A test result obtained by using a sample as an SN plate in an B steel plant. The value indicates the number of usable cycles.

BRIEF DESCRIPTION OF THE DRAWINGS

FIG. 1 is an $Al_2O_3$—$ZrO_2$—$SiO_2$ system phase diagram.

FIG. 2A is a microscope photograph of a zirconia-mullite refractory raw material obtained in Inventive Example 3 (Table 1).

FIG. 2B is a microscope closeup-photograph of a eutectic zirconia crystal of the zirconia-mullite refractory raw material obtained in Inventive Example 3 (Table 1).

FIG. 3A is a microscope photograph of a zirconia-mullite refractory raw material obtained in Comparative Example 7 (Table 1).

FIG. 3B is a microscope closeup-photograph of a eutectic zirconia crystal of the zirconia-mullite refractory raw material obtained in Comparative Example 7 (Table 1).

FIG. 4A is a graph showing a measurement result on a thermal expansion rate of the zirconia-mullite refractory raw material obtained in Inventive Example 3 (Table 1), under repetitive thermal loading.

FIG. 4B is a graph showing a measurement result on a thermal expansion rate of the zirconia-mullite refractory raw material obtained in Comparative Example 7 (Table 1), under repetitive thermal loading.

The invention claimed is:

1. A zirconia-mullite refractory raw material which is obtained through a fusion process, the zirconia-mullite refractory raw material comprising crystalline zirconia and mullite as primary components, with the remainder being corundum and/or a matrix glass, wherein the crystalline zirconia includes a eutectic zirconia crystal having a grain size of 1.0 µm or less, and the matrix glass is contained in an amount of 5 mass % or less.

2. A zirconia-mullite refractory raw material which is obtained through a fusion process, the zirconia-mullite refractory raw material consisting of crystalline zirconia and mullite, wherein the crystalline zirconia includes a eutectic zirconia crystal having a grain size of 1.0 µm or less.

3. The zirconia-mullite refractory raw material as defined in claim 1, wherein the crystalline zirconia has a maximum grain size of 30 µm or less.

4. The zirconia-mullite refractory raw material as defined in claim 3, which has a chemical composition comprising 30 to 55 mass % of $ZrO_2$, 30 to 55 mass % of $Al_2O_3$ and 10 to 25 mass % of $SiO_2$, wherein each of the chemical components falls within a primary phase region of $ZrO_2$ in an $Al_2O_3$—$ZrO_2$—$SiO_2$ system phase diagram.

5. The zirconia-mullite refractory raw material as defined in claim 4, which has an apparent porosity of 3.0% or less.

6. The zirconia-mullite refractory raw material as defined in claim 5, which contains $Na_2O$, $K_2O$, $CaO$, $MgO$, $P_2O_5$, $B_2O_3$, $Fe_2O_3$ and $MnO_2$ in a total amount of 1.0 mass % or less.

7. A plate brick which contains the zirconia-mullite refractory raw material as defined in claim 1, in an amount of 5 to 40 mass %.

8. The zirconia-mullite refractory raw material as defined in claim 2, wherein the crystalline zirconia has a maximum grain size of 30 µm or less.

9. The zirconia-mullite refractory raw material as defined in claim 8, which has a chemical composition comprising 30 to 55 mass % of $ZrO_2$, 30 to 55 mass % of $Al_2O_3$ and 10 to 25 mass % of $SiO_2$, wherein each of the chemical components falls within a primary phase region of $ZrO_2$ in an $Al_2O_3$—$ZrO_2$—$SiO_2$ system phase diagram.

10. The zirconia-mullite refractory raw material as defined in claim 9, which has an apparent porosity of 3.0% or less.

11. The zirconia-mullite refractory raw material as defined in claim 10, which contains $Na_2O$, $K_2O$, $CaO$, $MgO$, $P_2O_5$, $B_2O_3$, $Fe_2O_3$ and $MnO_2$ in a total amount of 1.0 mass % or less.

12. A plate brick which contains the zirconia-mullite refractory raw material as defined in claim 2, in an amount of 5 to 40 mass %.

* * * * *